United States Patent [19]

Tanaka et al.

[11] Patent Number: 4,862,295
[45] Date of Patent: Aug. 29, 1989

[54] METHOD OF FORMATTING A STORAGE MEDIUM AND DRIVE UNIT FOR CONTROLLING THE READING AND WRITING OF DATA ON THE FORMATTED STORAGE MEDIUM

[75] Inventors: Shinichi Tanaka, Kyoto; Shigeru Matsukawa, Katano, both of Japan

[73] Assignee: Matsushita Electric Industrial Co., Ltd., Osaka, Japan

[21] Appl. No.: 879,042

[22] Filed: Jun. 26, 1986

[30] Foreign Application Priority Data

Jun. 27, 1985 [JP] Japan .................................. 60-140820
Mar. 7, 1986 [JP] Japan .................................. 61-51164

[51] Int. Cl.$^4$ .......................... G11B 5/09; G11B 7/007
[52] U.S. Cl. ......................................... 360/48; 360/49; 369/59
[58] Field of Search .................... 360/40, 48, 49, 51, 360/72.2; 375/118; 369/32, 59, 275

[56] References Cited

U.S. PATENT DOCUMENTS

| | | | |
|---|---|---|---|
| 3,829,837 | 8/1974 | Farr, Jr. .................. | 360/49 |
| 4,081,844 | 3/1978 | Devore et al. ........... | 360/48 |
| 4,126,887 | 11/1978 | Miyazaki et al. ......... | 360/49 |
| 4,380,029 | 4/1983 | Bode ....................... | 360/48 |
| 4,402,021 | 8/1983 | Sonoda et al. ........... | 360/48 |
| 4,507,693 | 3/1985 | Matsuda et al. .......... | 360/72.2 |
| 4,525,840 | 6/1985 | Heinz et al. ............. | 375/118 |
| 4,535,439 | 8/1985 | Satoh et al. ............. | 369/275 |
| 4,545,044 | 10/1985 | Satoh et al. ............. | 369/32 |
| 4,630,140 | 12/1986 | Sugimura et al. ........ | 360/49 |
| 4,647,991 | 3/1987 | Zangenhpour ............ | 360/48 |
| 4,656,532 | 4/1987 | Greeberg et al. ........ | 360/49 |

FOREIGN PATENT DOCUMENTS 0017271 1/1986 Japan ..................................... 369/32

Primary Examiner—Alan Faber
Assistant Examiner—Surinder Sachar
Attorney, Agent, or Firm—Wenderoth, Lind, & Ponack

[57] ABSTRACT

A method of formatting a storage medium into sectors format the sectors such that each contains an ID field for storing ID information. The ID information includes addresses of a plurality of sectors, preferably the address of the sector containing the ID field and the address of at least one subsequent sector. A drive unit for use with the storage medium formatted as described above reads the ID information from the ID field, and then temporarily stores either the ID information of a sector other than the sector containing the ID field or the result of an evaluation of the ID information, and refers to the stored ID information when the address of the sector corresponding to the stored information is later examined.

10 Claims, 6 Drawing Sheets

FIG. 3

| Attribute | | | | | | | |
|---|---|---|---|---|---|---|---|
| $b_7$ | $b_6$ | $b_5$ | $b_4$ | $b_3$ | $b_2$ | $b_1$ | $b_0$ |
| | | | Bad sector flag | End sector flag | Sector length | | |

METHOD OF FORMATTING A STORAGE MEDIUM AND DRIVE UNIT FOR CONTROLLING THE READING AND WRITING OF DATA ON THE FORMATTED STORAGE MEDIUM

BACKGROUND OF THE INVENTION

1. Field of the Invention

The present invention relates to a method of formatting a storage medium into sectors for storing information. The invention also relates to a drive unit that can store data in and retrieve data from such a storage medium.

2. Description of the Prior Art

In recent years, storage media used as external storage for electronic computers have tended to have higher storage densities. With this tendency the amount of errors contained in the information read from a storage medium having defects has tended to increase. Accordingly, it is the common practice to append error-correcting codes (ECCs) to the information to be written. However, a considerable time is taken to decode encoded words containing such error-correcting codes. Therefore, these error-correcting codes which provide powerful error correction are not generally added to each ID (identification) field storing ID information including addresses, but rather only error-detecting codes, such as cyclic redundancy codes (CRCs) are appended to ID fields, because a sufficient time cannot be obtained during the period which begins with the reading of data from one ID field and ends with the arrival at the subsequent data field. Accordingly, a formatting has been proposed in which an ID block including cyclic redundancy codes as well as ID information about the identification of the sector is repeatedly written at consecutive locations within the ID field of each sector.

It is possible to enhance the reliability with which ID information is read out, by this conventional method of formatting. Unfortunately, erroneous reading of information tends to take place consecutively through several bytes, which is generally known as a burst error. If this burst error is especially long, it would occur that any of the same ID information written at some locations cannot be read. In this way, a sufficient reliability cannot be offered by merely writing the same ID information at a plurality of locations on the storage medium that tends to produce long burst errors. Also, it is necessary that the same ID block be written at more locations in order to provide immunity to long burst errors. In this case, there arises the problem that the redundancy increases.

SUMMARY OF THE INVENTION

It is an object of the present invention to provide a method of formatting a storage medium in such a way that ID information can be read from the medium with a sufficient reliability even if long burst errors occur, although the redundancy produced by the writing of the same ID information at plural locations is not so large.

It is another object of the invention to provide a drive unit for use with the storage medium formatted as described just above.

According to the present invention, a storage medium is formatted in such a manner that an ID field of a sector has ID information of a plurality of sectors each bearing a predetermined positional relationship to the sector. ID information of a sector includes the address of the sector. A drive unit which writes data in or reads data from the storage medium formatted in this way ascertains addresses in the manner described below. For reading data from a certain sector, the drive unit read the ID information stored in consecutive ID fields until an ID field having ID information of the certain sector is found. All or a part of the ID information in the ID field is directly stored temporarily in a memory, or all or a part of the addresses in the ID information is compared with the address of the sector of interest and the comparison results are temporarily stored in the memory. Thus, there are chances that the information about the address of the certain sector can be read from plural ID fields. If ID information of a desired sector can be correctly read from any one ID field containing the ID information of the desired sector, the position of the desired sector can be known, because the position of the sector having this ID field relative to that of the desired sector is predetermined.

In the above arrangement, address information corresponding to each sector is written in plural ID fields at plural locations. Therefore, the information regarding the address of a sector may be recognized at least once from one of these ID fields. Since adjacent ID fields are separated by a data field intervening therebetween, the probability that none of the address information can be read because of an occurrence of a burst error is reduced. Hence, the address information can be ascertained with a remarkably high reliability.

It is possible to write into an ID field of a sector only the address of the sector and a sector number of a next sector as the address information of the next sector. In this case, the track number of the next sector can be inferred from the track number of the current sector. This can further reduce the redundancy of the ID field.

When the track storing information is spiral, the ID field in the last sector of a logically partitioned logical track contains information indicating that it is the last sector of the logical track. Accordingly, the track number of next sector can always be inferred.

When the track storing information is spiral as described above, it is desired to divide the track by a half circular pitch, each half turn being taken as a logical track. Thus, when a certain logical track is scanned repeatedly, the track on the other half turn may be skipped, whereby the logical track can be scanned repeatedly in an efficient manner.

BRIEF DESCRIPTION OF THE DRAWINGS

FIG. 3 is a table of the bits assigned within one byte of data, for showing the attribute of one sector of a storage medium formatted in accordance with the present invention;

DESCRIPTION OF THE PREFERRED EMBODIMENTS

Figure 1:
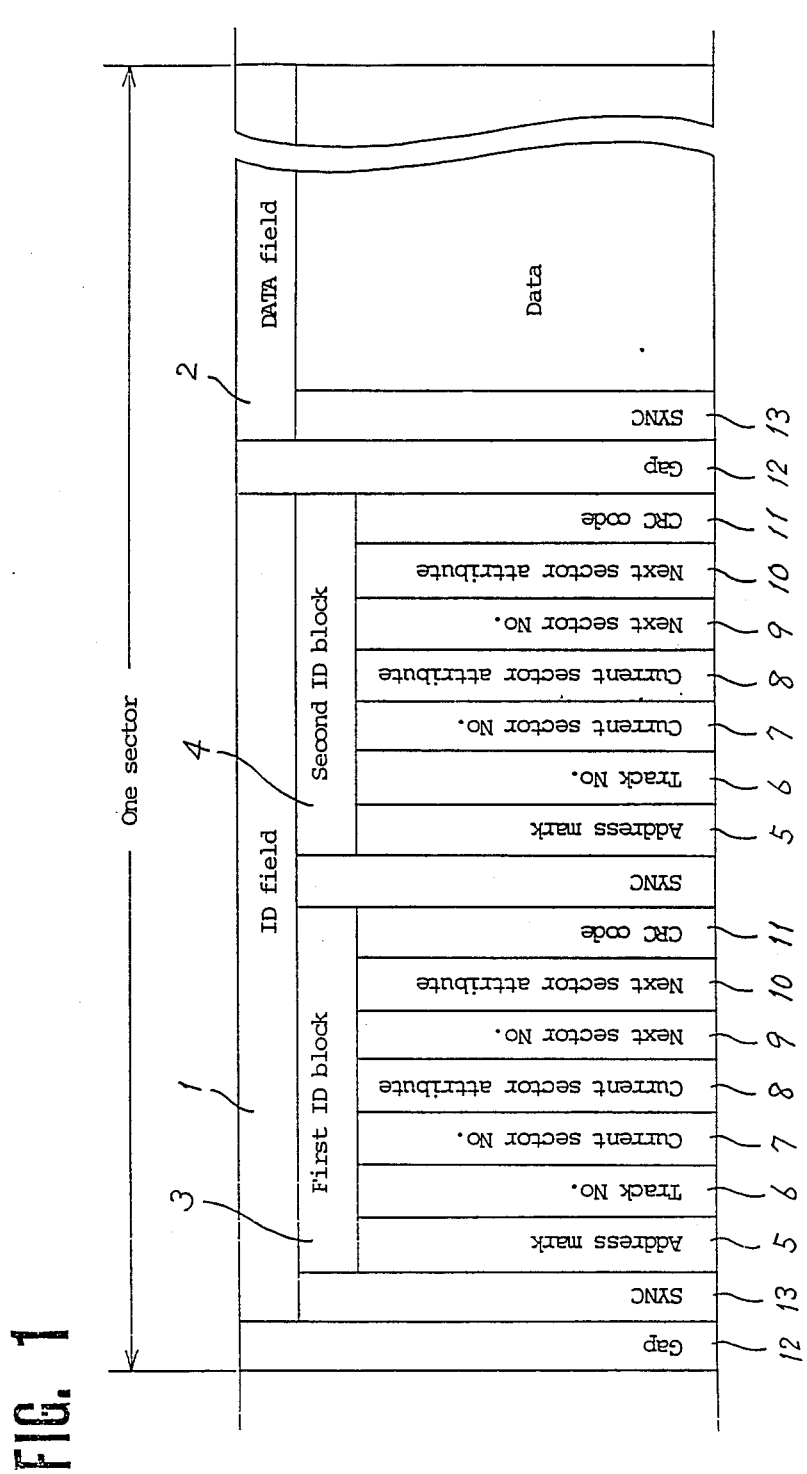
FIG. 1 is a diagram for illustrating conceptually one sector of a storage medium formatted in accordance with the present invention.

Referring to FIG. 1, there is shown one sector of a storage medium according to the present invention. This sector has an ID field 1 for storing ID information and a data field 2 for storing data. An intersector gap 12 is formed between the ID field 1 and the data field 2 to prevent the fields from overlapping each other when information is written in the data field 2. The ID field 1, the data field 2, and the gap 12 form one sector. Other similar sectors are located continuously from this sector to constitute a track that stores information (an information track). In the case of the ordinary magnetic recording medium, tracks of this kind are concentric, and the annular tracks are consecutively numbered. These numbers given to the tracks are known as "track numbers". Also, the sectors constituting each track are numbered in a serial order. These numbers are known as "sector numbers". Note that the sectors are not always numbered consecutively. Sometimes, they are numbered in a discrete manner, in which case, the sectors are normally called "interleaved sectors". The address information of each sector consists of the track number and the sector number. In the present example, the track storing information is shaped into a spiral form and divided by a half circular (180°) pitch. Every half turn of the spiral track is serially numbered. These are referred to as "logical tracks". The aforementioned ID field 1 contains a first ID block 3 and a second ID block 4. The same ID information is written in the blocks 3 and 4 that are preceded by a SYNC field 13 on which synchronizing data is recorded to pull a PLL into synchronism, the PLL acting to extract reading clocks from the fetched information. Each of the ID blocks 3 and 4 consists of an address mark 5 for byte synchronization, a track number 6 given to the logical track containing this sector, a sector number 7 given to this sector (current sector No.), attribute 8 of this sector (current sector attribute), a sector number 9 given to next sector (next sector No.), attribute 10 of the next sector (next sector attribute), and a cyclic redundancy code (CRC) 11 for error detection.

Figure 4:
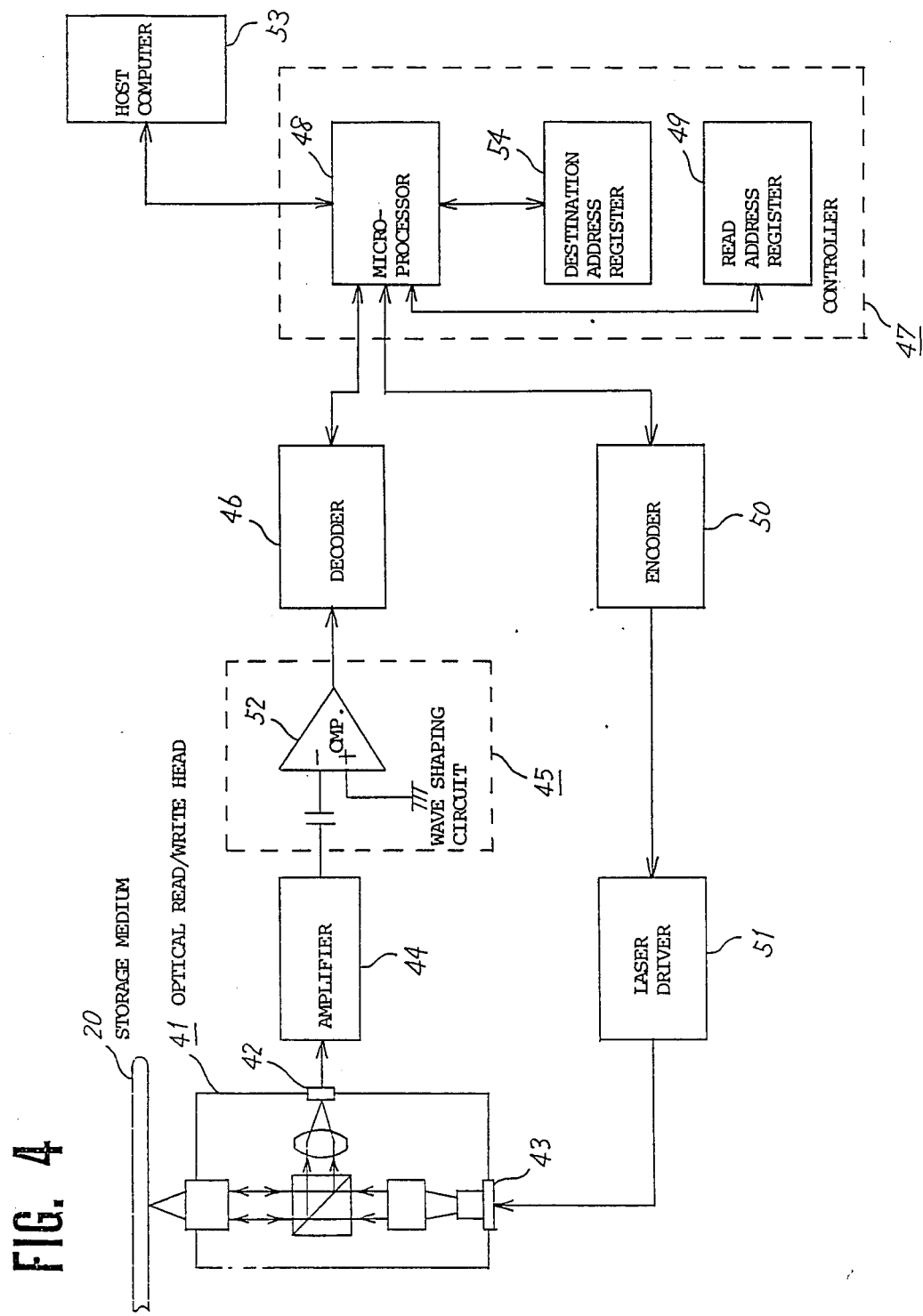
FIG. 4 is a block diagram of a drive unit for use with the storage medium formatted as shown in FIGS. 1-3.

It is assumed that the storage medium formatted into tracks and sectors as described above is an optical disk. A disk drive or disk unit for use with this optical disk is shown in FIG. 4 in block diagram, where the optical disk, or recording medium, is indicated by reference numeral 20. The disk drive comprises a controller 47, an optical read/write head 41, an amplifier 44, a wave-shaping circuit 45, a decoder 46, a laser driver 51, and an encoder 50. The controller 47 comprises a microprocessor 48, a destination address register 54, and a read address register 49, and is connected to a host computer 53.

When data is read from a certain sector, the host computer 53 supplies an address signal indicating the address of the sector to the controller 47. The address signal is fed via the microprocessor 48 to the destination address register 54, where it is held. The optical read/write head 41 includes a detector 42 and a laser 43. When the head 41 scans the disk 20 and retrieves data from it, the detector 42 produces a signal The optical head 41 is not limited to a specific structure. Also, the optical head may be replaced by a magnetic head or other types of heads. The output signal from the head 41 is amplified by the amplifier 44 and then transformed into binary form by the wave-shaping circuit 45 to obtain a channel code. In the present example, the wave-shaping circuit 45 consists of a capacitor and a comparator 52. The DC component of the output signal from the amplifier 44 is removed by the capacitor. The comparator 52 whose threshold level is ground potential shapes the waveform of its input signal. It is to be understood, however, that the wave-shaping circuit is not restricted to this arrangement. For example, the threshold level may be always controlled to the best level, or a peak detection may be employed. The decoder 46 converts the channel code back to the original information. When the desired sector is searched, the microprocessor 48 causes the decoder 46 to find the address mark 5 (FIG. 1) that is a special code not found in ordinary information. If the decoder 46 finds the address mark 5 within the first ID lock 3, it transfers the ID information following this mark to the microprocessor 48.

The microprocessor 48 checks the ID information transmitted from the decoder 46 for the cyclic redundancy. If no error is detected, the microprocessor 48 places this ID information into the read address register 49. If an error is detected, certain information not actually existing is stored in the register 49. Information is read similarly from the second ID block 4. If a cyclic redundancy check proves that the information is correct, this is also loaded into the read address register 49. If the information is proved incorrect, the certain information actually not existing is stored in the register 49. The microprocessor 48 refers to the data at a certain location in which the ID information in the current sector is to be stored, among the stored ID information. The data is compared with the address of the desired sector stored in the destination address register 54. If the ID information read from different locations prove that the address of the current sector coincides with the address of the desired sector, then the current sector is recognized as the desired sector. These operations are repeated until the desired sector is found. Then, data is read from the data field of the current sector is a known manner. That is, the SYNC data at the beginning of the data field synchronizes the decoder 46 with clocks. Thereafter, if a data mark that is a special code is found, the channel code subsequent to it is decoded to reproduce the original information, which is transferred to the host computer 53 via the microprocessor 48.

When a certain sector is rewritten, the microprocessor 48 reads the address information of the current sector from at least one of the ID blocks of the ID field of the current sector. When the same address information of this sector is read from two ID blocks, the address of this sector is regarded as being recognized. Subsequently, the address of the desired sector is found and the sector is rewritten in a known manner. Specifically, the data field of the desired sector is accessed, an instruction from the microprocessor 48 causes the encoder 50 to output SYNC data of a given length and above-described data mark. Then, the data to be recorded are encoded into channel codes. The laser driver 51 drives the laser 43 according to the channel codes. Thus, the data is recorded on the disk 20.

As described above, in accordance with the present invention, the address information of each sector is written in the ID field of the sector and also in the ID field of the preceding sector. Therefore, the address of each sector can be recognized with a remarkably improved reliability. Since the ID fields are separated by the data fields, a sufficient immunity to long burst errors can be obtained with a relatively low redundancy.

Figure 2:
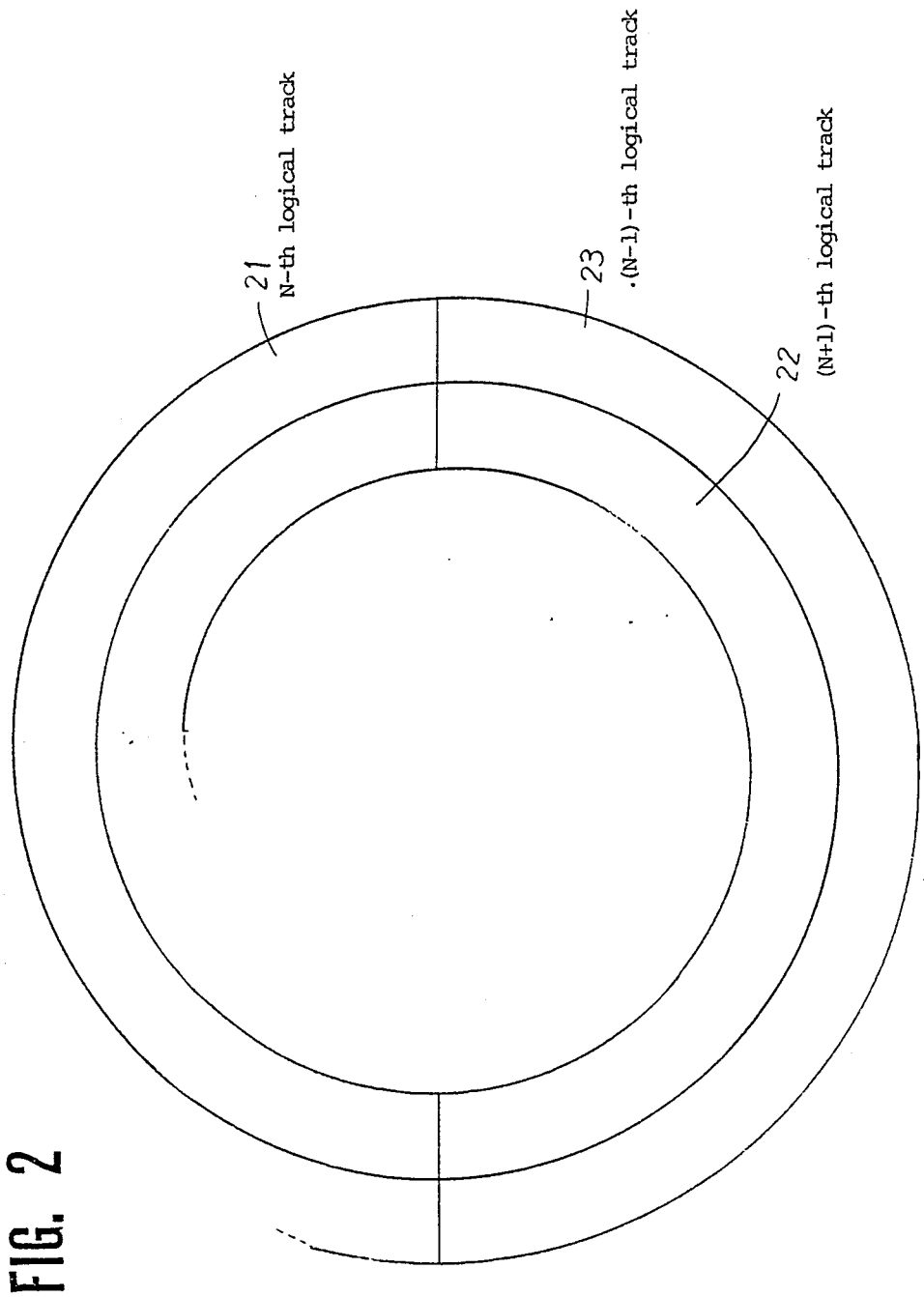
FIG. 2 is a view for illustrating conceptually a storage medium formatted into logical tracks in accordance with the present invention.

The microprocessor 48 loads the address information of the next sector into the read address register 49 in the manner described below. The ordinary magnetic recording medium or the like has concentric tracks which are serially numbered from the outer or inner end. The read/write head 41 scans repeatedly the same information track. During this repetitive scanning operation, the track number does not change and so the requirement is only that the track number is read from at least one of the sectors within the track. In the present example, as shown in FIG. 2, a track for storing information is shaped into a spiral form and divided into logical tracks each of an arc of 180°. In order to facilitate discerning boundaries between successive logical tracks, the bit $b_3$ of the attribute 8 or 10 in the ID block of the last sector of each logical track is set to "1", while the bit $b_3$ of the attribute 8 or 10 in the ID block of each of the other sectors are set to "0". Thus, it can be seen from the ID field of the last sector of the logical track that the sector is the last one. Accordingly, the track number of the logical track including the next sector is derived by adding 1 to the track number recorded in the ID field of the last sector.

In the present example, each logical track is an arc of 180°. This makes it easy to scan a same logical track repeatedly. For example, when the N-th logical track 21 is to be scanned, the head is caused to jump one track back to the N-th track 21 while scanning the (N+1)-th track 22. Then, the track 21 can be again scanned When this repeated scan is made, it is desired to repeatedly scan the preceding sector as well as the sectors of the N-th logical track 21, because the address information of the first sector within the N-th logical track 21 is written in both the ID field of the first sector and the ID field of the last sector of the preceding (N−1)-th logical track 23. For this purpose, the jump across the track is completed until the last sector of the (N−1)-th logical track 23 is reached. This makes it possible to repeatedly scan the N-th logical track 21 each time the medium is rotated. Further, the addresses of every sector included in the N-th track 21 can be read from both the ID field of each sector and the ID field of the preceding sector. Although the sector number of the first sector of the N-th track 21 is recorded in the ID field of the last sector of the (N−1)-th track 23, the track number is different. Checking the attribute of the last sector shows that the bit $b_3$ is "1". The track number of the first sector of the N-th track 21 can be inferred from the result of this check. In this way, track number information which should be recorded in each ID field may only be the track number of the sector containing the ID field. Consequently, the number of bytes to be recorded in each ID field can be reduced.

In the above example, what are recorded in the ID field of each sector are the address information of the sector and the address information of the next sector. The present invention is not limited to this scheme. For example, the address information of any sector following the next sector or the address information of more sectors may be recorded. In this case, the read address register 49 can store a large amount of address information.

Figure 5:
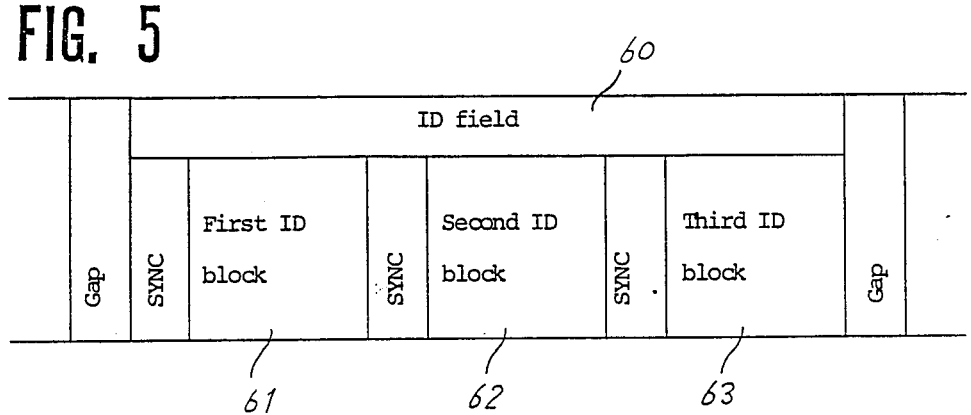
FIG. 5 is a diagram for illustrating conceptually another storage medium formatted into sectors in accordance with the present invention.
Figure 6:
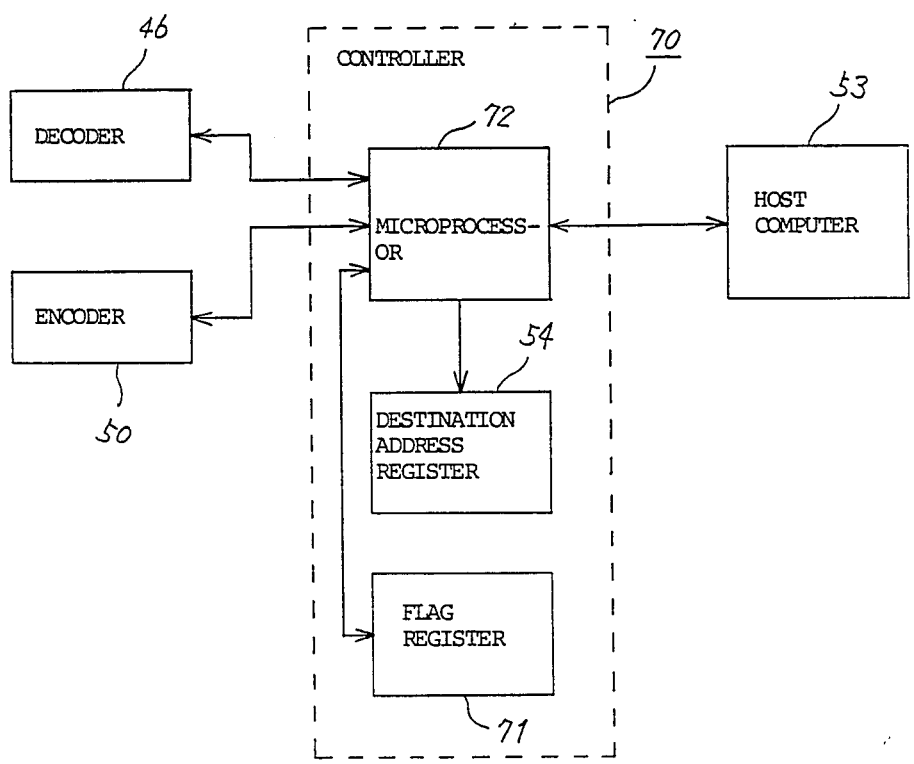
FIG. 6 is a block diagram of the main portion of the drive unit for use with the storage medium illustrated in FIG. 5.

Also in the above example, the same ID block is written at two locations within one ID field. The same ID block may be written at more locations within one ID field to enhance the reliability. For instance, as shown in FIG. 5, first, second and third ID blocks 61, 62 and 63, respectively, may be written within an ID field 60, the blocks 61–63 storing the same ID information including the address information of one sector and the address information of the next sector. In this case, all of the information read from these blocks are written in the read address register 49. Thus, a larger storage capacity is required. A controller 70 that fulfills this requirement is shown in FIG. 6. The controller 70 comprises a microprocessor 72, a destination address register 54 that is the same as the register 54 shown in FIG. 4, and a flag register 71. The microprocesser 72 compares the ID information successively input to it with the address of the desired sector held in the register 54. Only the evaluated results are stored in the flag register 71.

Also in the present example, address information is read from a plurality of ID blocks, and only when they coincide with each other without a CRC error, is the address taken as a correct address. This is because the generally used cyclic redundancy code is a 2-byte code, and therefore, the probability of failure to detect a CRC error is not negligible. In other words, erroneously read ID information would not be detected. However, if the probability of the failure to detect a CRC error is made negligible by using a cyclic redundancy code composed of more bytes, say four bytes, ID information read from at least one ID block may be recognized as correct ID information. In this case, it is not necessary that the read address register 49 store all the address information read from an ID field, but rather the register 49 may store only the address information of the sectors other than the address information of the sector containing the ID field.

In the present example, a certain sector is written or rewritten only if address information is read from at least one ID block of the ID field of the sector, because during the period beginning with the reading of the address of the certain sector from the ID field of the preceding sector and ending with the arrival at the certain sector, if the tracking control becomes inoperative, the head jumps to other track, and no information can be read from the next ID field, then it is highly possible that the information stored in other track is destroyed. Accordingly, if the freedom from tracking control can be detected with certainty and such an incorrect erasure can be prevented, the sector may be written or rewritten when the address of a certain sector is read at least once within an arbitrary ID field.

Figure 7:
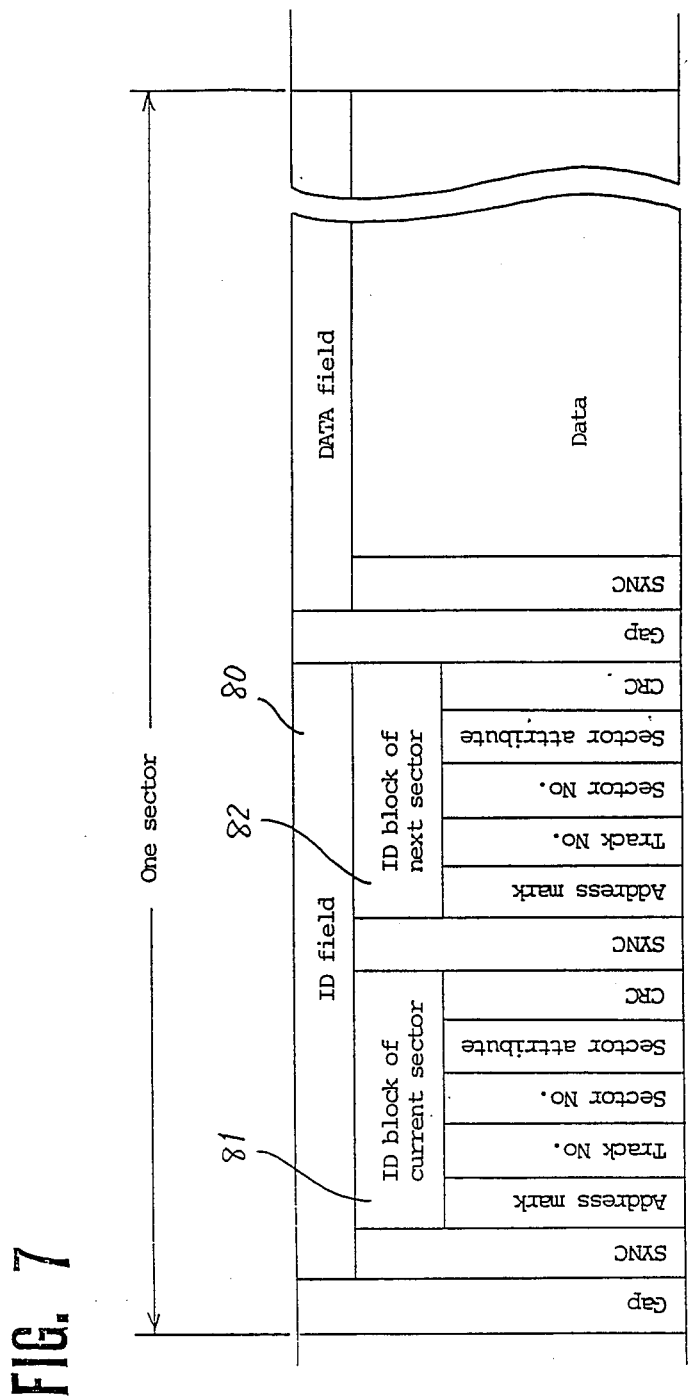
FIG. 7 is a diagram for illustrating conceptually a further storage medium formatted into sectors in accordance with the present invention.

Also in the present example, each ID field contains a plurality of ID blocks storing the address information of a plurality of sectors. It is not always necessary that each ID field contain a plurality of ID blocks. For example, as shown in FIG. 7, an ID field 82 may contain an ID block 81 storing only the ID information for the current sector and an ID block 82 storing only the ID information for the next sector.

With respect to the attribute of each sector, only bit $b_3$ indicating whether the sector is the last one of the logical track has been described. As shown in FIG. 3, bits $b_0$–$b_2$ indicate the length of the sector, and bit $b_4$ indicates a defective sector. Note that these bits constitute only one example of the attribute. The present invention is not limited to this usage.

While the invention has been particularly shown and described with reference to preferred embodiments thereof, it will be understood by those skilled in the art that various changes and modifications may be made without departing from the spirit and scope of the invention. Especially, many variations may be made to the sequence in which various components are controlled by the microprocessor 48. Obviously, if a format differing from the format described above is used, different operations are necessitated.

What is claimed is:

1. A method formatting a storage medium comprising the steps of:
    dividing the storage medium into a plurality of sectors each containing an identification field; and
    recording identification information in the identification field, the identification information having address information of a plurality of sectors including the sector containing the identification field and at least one of the other sectors each being in a predetermined position on the storage medium relative to a position of the sector containing the identification field on the storage medium;
    wherein the plurality of sectors on the recording medium are arranged spirally to form a spiral information track which is divided into a plurality of logical tracks; and,
    wherein the address information includes a track number of logical track on which the sector containing the identification field is located, a sector number of the sector containing the identification field, a track number of a logical track on which at least one of the other sectors is located, and a sector number of at least one of the other sectors.

2. A method of formatting a storage medium comprising the steps of:
    dividing the storage medium into a plurality of sectors each containing an identification field; and
    recording identification information in the identification field, the identification information having address information of a plurality of sectors including the sector containing the identification field and at least one of the other sectors each being in a predetermined position on the storage medium relative to a position of the sector containing the identification field on the storage medium;
    wherein the plurality of sectors on the recording medium are arranged spirally to form a spiral information track which is divided into a plurality of logical tracks;
    wherein the other sectors are positioned subsequent to the sector containing the identification field on the storage medium; and
    wherein the address information includes a track number of a logical track on which the sector containing the identification field is located, a sector number of the sector containing the identification field and a sector number of at least one of the other sectors.

3. A method for formatting a storage medium comprising the steps of:
    dividing the storage medium into a plurality of sectors each containing an identification field; and
    recording identification information in the identification field, the identification information having address information of a sector containing the identification field and a next sector positioned next to the sector containing the identification field on the storage medium;
    wherein the plurality of sectors are arranged spirally to form a spiral information track which is divided into a plurality of logical tracks; and,
    wherein the address information of the sector containing the identification field includes a track number of a logical track on which the sector containing the identification field is located and a sector number of the sector containing the identification field, and the address information of the next sector includes a sector number of the next sector.

4. A drive unit for controlling writing of data in and reading of data from a storage medium having a plurality of sectors each containing an identification field and a data field, said identification field having identification information recorded therein, said identification information having address information of a plurality of sectors including a sector containing said identification field and at least one of other sectors each being in a predetermined position on said storage medium relative to a position of said sector containing said identification field on said storage medium, said drive unit comprising:
    a read/write means for writing data and reading data from said storage medium;
    an address storage means for storing in a specified location at least a part of the address information of said at least one of the other sectors read from said identification field; and
    a control means for controlling said read/write means to write data in and read data from a data field of a desired sector, said control means, when identifying a current sector as said desired sector, compares an address of said desired sector with at least one of an address obtained from address information of said current sector read from an identification field of said current sector and an address obtained from address information of said current sector stored in said specified location of said address storage means.

5. A drive unit as set forth in claim 4, wherein said address storage means stores in said specified location predetermined information which is different from address information of any one of the sectors on said storage medium when address information which should be stored in said address storage means is not correctly read from an identification field of a sector.

6. A drive unit as set forth in claim 5, wherein, when data is to be written into the data field of said desired sector, said control means identifies said current sector as said desired sector only when the address obtained from the address information of said current sector read from the identification field of said current sector coincides with the address of said desired sector, and, when data is to be read from the data field of said desired sector, said control means identifies said current sector as said desired sector when at least one of the address obtained from the address information of said current sector read from the identification field of said current sector and the address obtained from the address information of said current sector stored in said specified location of said address storage means coincides with the address of said desired sector.

7. A drive unit for controlling writing of data and reading of data from a storage medium having a plurality of sectors each containing an identification field and a data field, said identification field having identification information recorded therein, said identification information having address information of a sector containing said identification field and a next sector positioned next to said sector containing said identification field on said storage medium, said drive unit comprising:

a read/write means for writing data in and reading data from said storage medium;

an address storage means for storing in a specified location at least a part of the address information of said next sector read from said identification field; and a control means for controlling said read/write means to write data into and read data from a data field of a desired sector, said control means, when identifying a current sector as said desired sector, compares an address of said desired sector with at least one of an address obtained from address information of said current sector read from an identification field of said current sector and an address obtained from address information of said current sector stored in said specified location of said address storage means.

8. A drive unit as set forth in claim 7, wherein said identification field is divided into at least two identification blocks each having said identification information recorded therein, said identification information having the address information of said sector containing said identifications field and said next sector, and wherein, when data is to be written into the data field of said desired sector, said control means identifies said current sector as said desired sector only when both an address obtained from address information of said current sector read from at least one of identification blocks of said current sector and an address obtained from address information of said current sector stored in said specified location of said address storage means coincide with the address of said desired sector, and, when data is to be read from the data field of said desired sector, said control means identifies said current sector as said desired sector when at least one of an address obtained from the address information of said current sector read from at least one of the identification blocks of said current sector and an address obtained from the address information of said current sector stored in said specified location of said address storage means coincides with the address of said desired sector.

9. A drive unit as set forth in claim 7, wherein said plurality of sectors are arranged spirally to form a spiral track which is divided into a plurality of logical tracks, an address of each sector being given by a track number of a logical track on which said each sector is located and a sector number of said each sector.

10. A drive unit as set forth in claim 9, wherein the address information of said sector containing said identification field includes a track number of a logical track on which said sector containing said identification field is located and a sector number of said sector containing said identification field, and the address information of said next sector includes a sector number of said next sector, and wherein said control means produces a track number of a logical track on which said next sector is located from the track number included in the address information of said sector containing said identification field.

* * * * *